United States Patent
Jacobs

(10) Patent No.: US 6,380,886 B1
(45) Date of Patent: Apr. 30, 2002

(54) CONSISTENT COMBINATION OF ALTIMETER DATA FROM MULTIPLE SATELLITES

(75) Inventor: Gregg A. Jacobs, Slidell, LA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/418,356

(22) Filed: Oct. 14, 1999

Related U.S. Application Data

(60) Provisional application No. 60/104,423, filed on Oct. 15, 1998.

(51) Int. Cl.$^7$ .......................... G01S 13/08; G06F 19/00
(52) U.S. Cl. ........................... 342/120; 342/165; 702/5
(58) Field of Search ................................ 342/120, 123, 342/165; 702/2, 3, 4, 5

(56) References Cited

U.S. PATENT DOCUMENTS 5,983,162 A * 11/1999 Huang ........................... 702/4

OTHER PUBLICATIONS

Fieguth et al., "Multiresolution Optimal Interpolation and Statistical Analysis of TOPEX/POSIDON Satellite Altimetry", IEEE Transactions on Geoscience and Remote Sensing, vol. 33, No. 2, 3/1995.*
Digby et al., "Altimeter Data for Operational use in the Marine Environment" OCEANS '99 MTS/IEEE. Riding the Crest into the 21st Century, vol: 2, 1999 pp. 605–613 vol.2.*
Hendricks et al., "Detection of seasonal oceanic steric height change using TOPEX/Poseidon satellite altimetry" Geoscience and Remote Sensing Symposium, 1994. IGARSS '94.*
Naeije et al., "A GLobal Sea Level Variability Study from almost a decade of Altimetry", Geoscience and Remote Sensing Symosium, IGARSS '96, 'Remote Sensing for a Sustainable Future.', International, vol. 1, 1996.*
Sharma et al., "Validity of ERS–1 Altimeter Corrections", IEEE Transactions on Geoscience and Remote Sensing, vol. 36, No.3, 5/1998.*
G.A. Jacobs and J. L. Mitchell, *Combining Multiple Altimeter Missions*, J. Geophysical Res., vol. 102, No. C10 at 23,187–23,206 (Oct. 15, 1997).

* cited by examiner

*Primary Examiner*—Ian J. Lobo
(74) *Attorney, Agent, or Firm*—John J. Karasek; Jane Barrow

(57) ABSTRACT

A method and apparatus are provided to allow altimeter data sets from multiple altimeter satellites to be used together. The measurable portion of geographically correlated orbit error (GCOE) is removed from the altimeter data sets, thereby allowing the data sets to be combined consistently. The GCOE structure for a reference data set is estimated through crossover difference analysis. The unmeasurable portion of the GCOE is not removed, although the spatial structure of this portion is determined. A reference mean sea level (SL) is corrected for the measurable GCOE and is then used as a reference surface for estimating the GCOE structure for an independent altimeter data set. This is performed by examining crossover differences between the altimeter mean SL and the reference mean SL at the multimission crossover points. The change in sea surface height (SSH) between the input data set and the reference data set is determined. The SSH change allows data sets from different altimeter satellites to be used together.

43 Claims, 15 Drawing Sheets

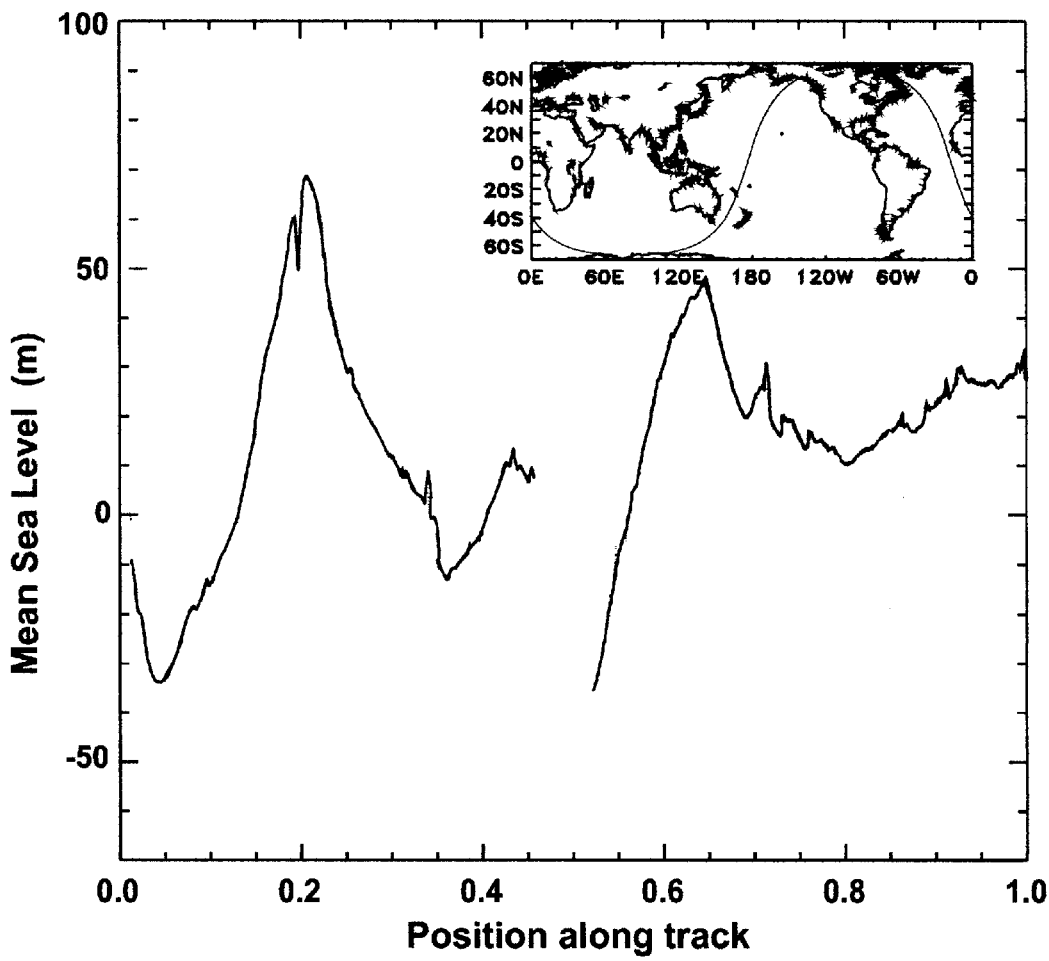

Figure 1

The mean sea level (SL) along one satellite altimeter ground track. The heights above the reference ellipsoid produce spatial variations which are orders of magnitude larger than the spatial variations produced by mean currents in the ocean. Present independent geoids have errors which are larger than sea surface height (SSH) variations due to ocean circulation on spatial scales less than a few hundred kilometers. Using data from separate altimeter satellites only at the multimission crossover points circumvents this problem.

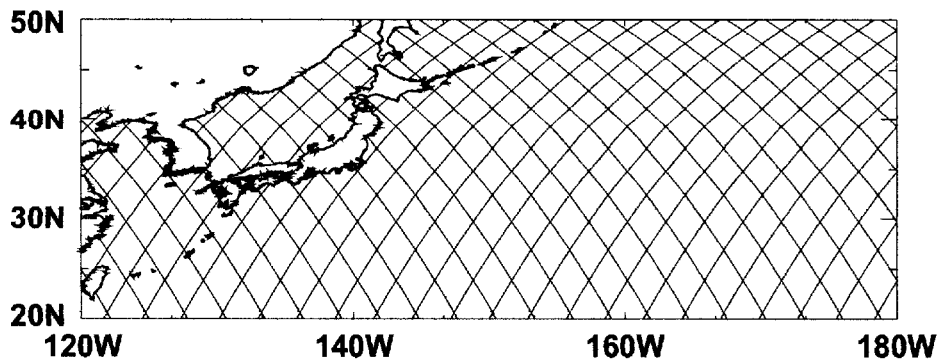

Figure 2a

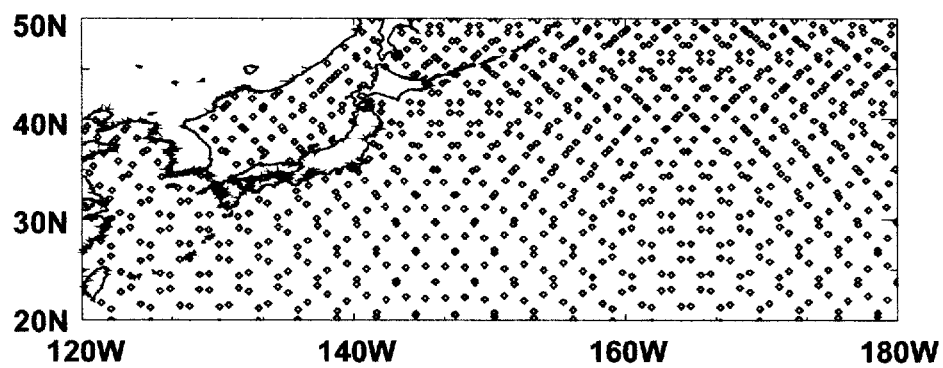

Figure 2b

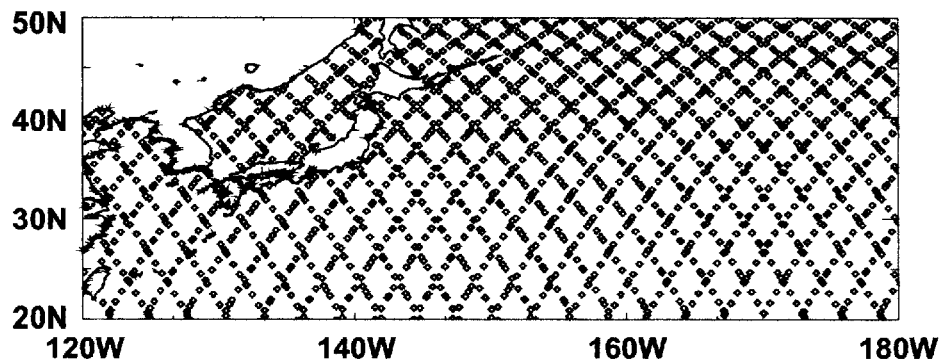

Figure 2c (a) Ground track pattern of T/P over the Kuroshio Extension region. Ground tracks are separated by a distance of about 315 km at the equator. Measurements exist about every 6.5 km along the ground tracks. (b) Points at which the Geosat-Exact Repeat Mission (Geosat-ERM) ground track intersects the T/P ground track. The spacing of the Geosat-ERM ground tracks is about 164 km at the equator. SSH changes from the Geosat-ERM epoch to the T/P epoch are observable at these multimission crossover locations, since the geoid is constant in time. (c) Points at which the ERS-1 35 day repeat ground track intersects the T/P ground track. The spacing of the ERS-1 ground tracks is about 80 km at the equator.

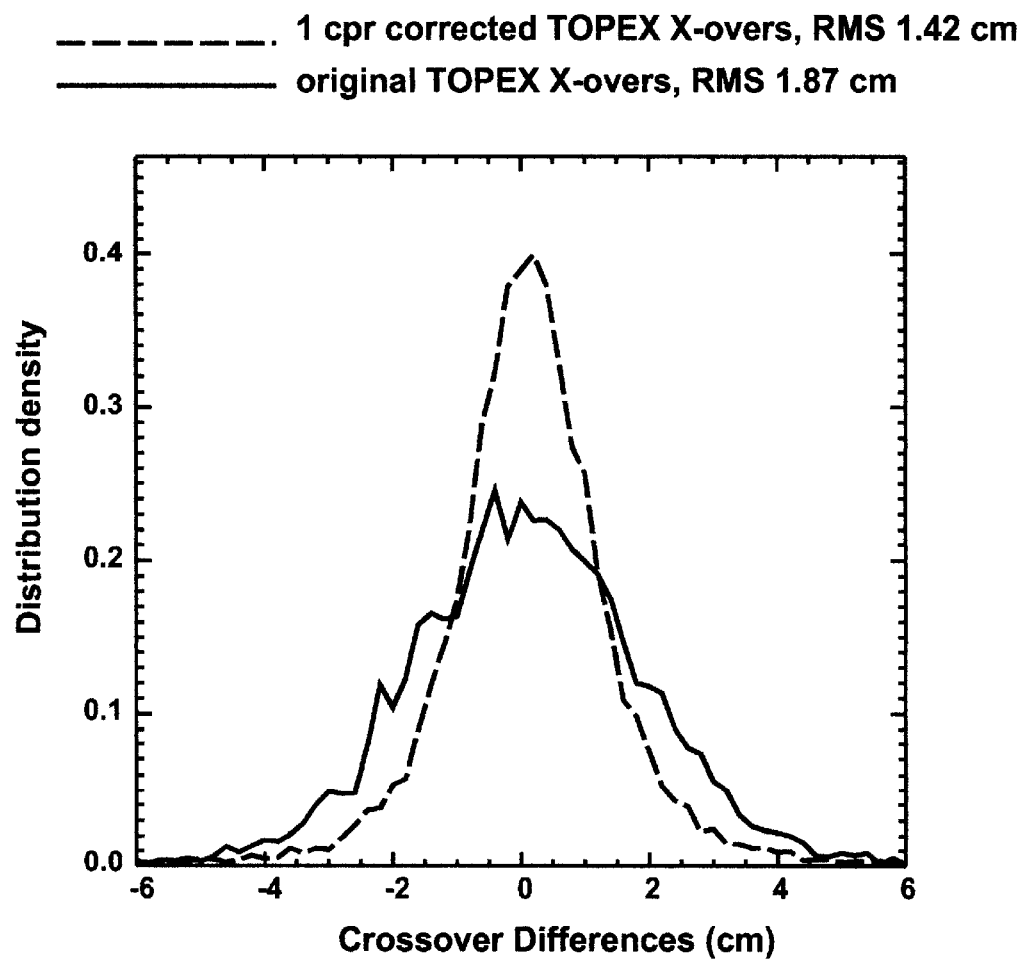

Figure 3

The distribution of T/P mean SL crossover differences before and after correcting for the Geographically Correlated Orbit Error (GCOE) through crossover minimization. The initial RMS crossover difference of 1.87 cm is reduced to 1.42 cm after a 1 cpr GCOE removal. The RMS GCOE removed is about .86 cm RMS. Some GCOE is not measurable by crossover differences (Figure 4), and this remains in the T/P mean SL.

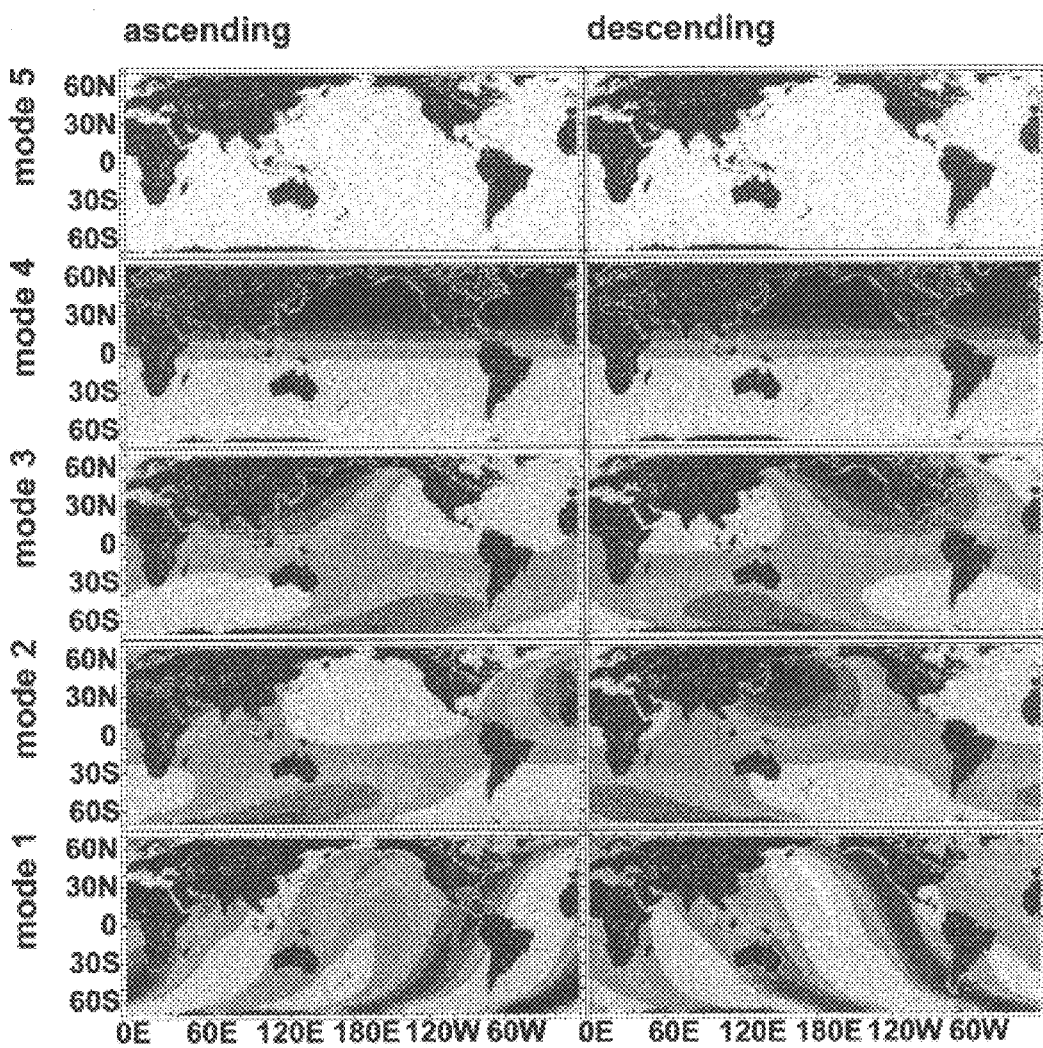

Figure 4

The first five modes' (left) ascending and (right) descending components. An eigenvector decomposition of the least squares matrix determines these modes. Mode numbers 1 and 2 have equal ascending and descending components, thus no crossover differences can be generated by including these modes in a GCOE solution. These modes are in the null space of the least squares matrix that was designed to minimize crossover differences. Modes 3 and 4 are badly measured as determined by the relative amplitude of their eigenvalues (Figure 5). Thus, the first four modes are not included in a solution to determine the GCOE.

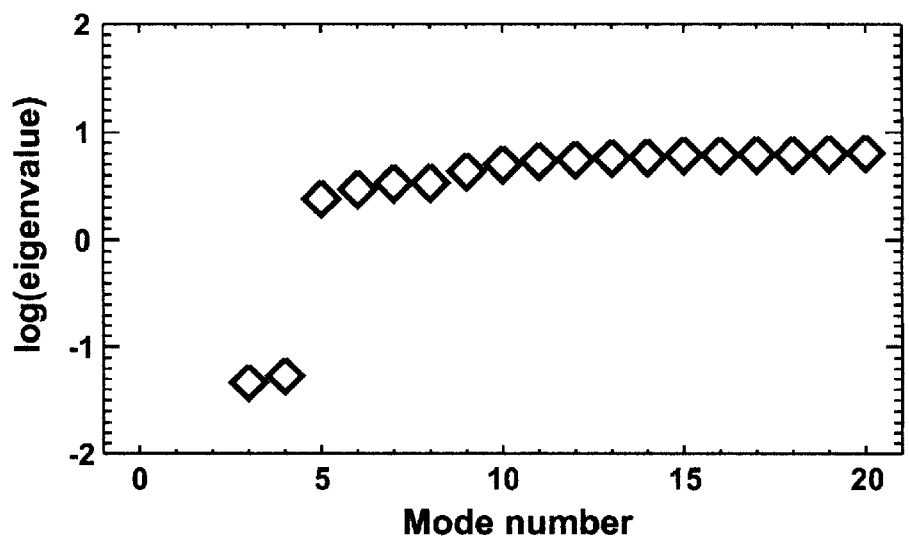

Figure 5

The eigenvalues for the least squares matrix to solve the GCOE. The eigenvalues for modes 3 and 4 are 4 orders of magnitude less than the largest eigenvalues and are 2 orders of magnitude less than the next larger eigenvalues. These modes are badly measured. Small errors in the data produce unrealistically large solutions for these modes, and thus these modes should not be included in a solution.

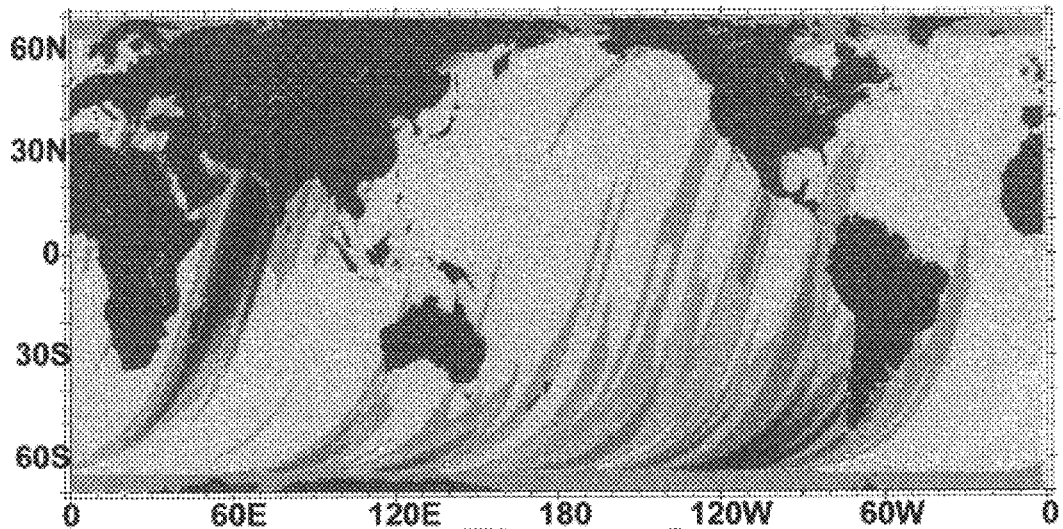
Figure 6a
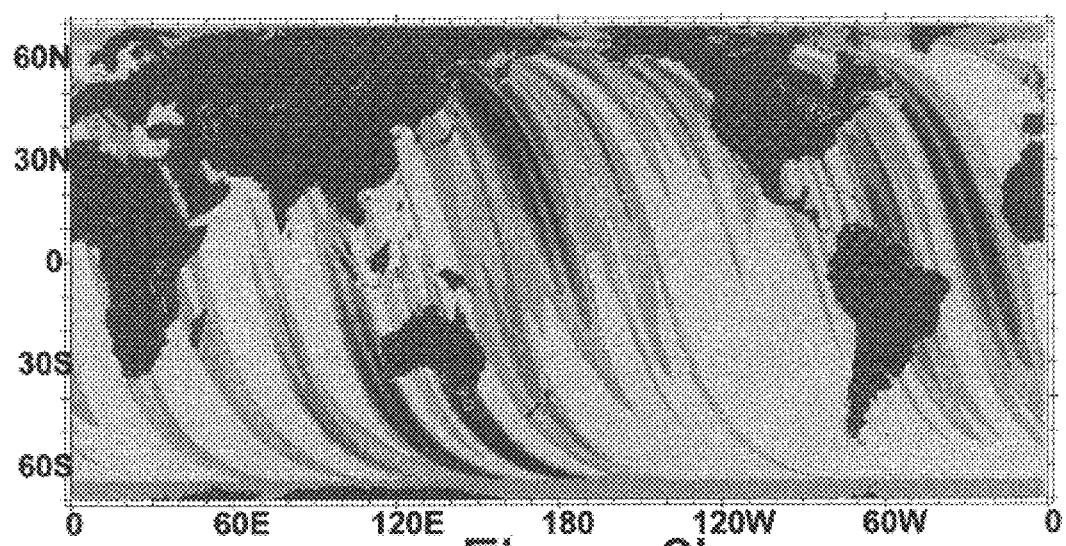
Figure 6b
The T/P GCOE solution for (a) ascending ground tracks and (b) descending ground tracks. The GCOE reduces RMS crossover differences from 1.87 cm to 1.42 cm (Figure 3). Thus the GCOE implies an RMS orbit error of 0.86 cm RMS as measured by crossover differences.

The GCOE corrections applied to the Geosat-ERM data. The color bar range is set from -50 to 0 cm.

The GCOE corrections applied to the ERS-1 data set. The color bar range is set from -70 to -20 cm.

(a) The ERS-1 SL anomalies to the T/P reference mean averaged over the 1 year time period from December 1, 1992, through November 30, 1993. (b) The T/P anomalies to the T/P reference mean averaged over the same 1 year period as in (a). The two results indicate good correlation between anomalies relative to a common mean.

CONSISTENT COMBINATION OF ALTIMETER DATA FROM MULTIPLE SATELLITES

CROSS-REFERENCE TO RELATED APPLICATION

This application claims the benefit of U.S. Provisional Application No. 60/104,423, filed Oct. 15, 1998.

BACKGROUND OF THE INVENTION

1. Field of the Invention

The present invention relates to processing of data sets collected from satellites in Earth orbit. More particularly, the present invention relates to an apparatus and method allowing altimeter data from multiple satellites to be combined consistently.

2. Description of the Related Art

Observing the ocean circulation on length scales of 50 km requires the combination of data from several satellite altimeters. Recent altimeter missions such as the Navy Geosat-Exact Repeat Mission (Geosat-ERM), European Space Agency Earth Remote Sensor-1 (ERS-1), and NASA TOPEX/POSEIDON (T/P) satellites have flown during different time periods, and this is the main difficulty in using these data together.

The use of a single altimeter satellite in isolation has been solved. The distance from Earth's reference ellipsoid to the surface of the ocean is defined as sea level (SL). The SL can be viewed as being composed of two parts: the geoid, which is constant in time, and deviations from the geoid due to oceanographic effects such as tides, currents, and thermal expansion. The ocean surface height above the geoid is the sea surface height (SSH). Over distances greater than a few kilometers, the marine geoid is capable of causing SL variations that are orders of magnitude greater than the contribution to SL caused by oceanographic effects (see FIG. 1).

For an altimeter in a repeat orbit, observing SL variations due to changes in the ocean about the mean state is straightforward. Since the geoid is constant in time, subtracting the mean over time at each point along the satellite's ground track removes the geoid influence. This process (known as collinear analysis) also removes the mean SSH but retains oceanic SSH variations about the mean. Observing SSH variability through collinear analysis has been the primary mode of applying altimetry to oceanographic observation. The key component that is required for using a single altimeter satellite is the mean SSH along the satellite ground tracks. Developing the mean SSH for each altimeter satellite in isolation has been done.

The main problem restricting the use of data from several satellite altimeters simultaneously is that the mean SSH to which different altimeter satellites are referenced has been measured over different time periods. For example, the Geosat-ERM satellite measured the SSH from 1986–1989, while T/P measured the SSH from 1992 to 1998. There are significant SSH changes between these time periods. The Navy Geosat Follow-On (GFO) mission, launched in February 1998, overlies the same ground tracks as the prior Geosat-Exact Repeat Mission. However, the SSH deviation measured by the GFO satellite may not be used consistently with the data from the T/P satellite unless some common reference is established for comparison. The missing piece of information is the SSH difference between the mean SSH over each time period. The present invention constructs the SSH difference between satellite altimeter missions.

The difficulty in producing the SSH change from one satellite mission to another is the different marine geoid sampled along the ground tracks of the various altimeter missions. Recent altimeters have been in different repeat orbits, sampling different geographical points and hence different locations on the marine geoid. One method for combining multiple altimeter data sets is to use a geoid produced from independent data sources. Many geoids exist on the basis of gravimetric data. However, on the scales of the ground track spacing of different altimeter missions (up to 157 km for the T/P and the Geosat-ERM or the T/P and the ERS-1 ground tracks) (see FIG. 2), the errors in the gravimetric geoids can be larger than the signal due to SSH features of interest. The geoid errors are due to bathymetric features such as seamounts and trenches that have large spatial gradients and are poorly resolved by existing data sets.

To remove geoid errors to an acceptable level, the SSH must be smoothed to scales larger than 2000 km. While significant ocean circulation does exist on scales greater than 2000 km, information on the smaller scales would be lost. In particular, the most important portion of the ocean variability for real-time applications, the eddy mesoscale field, would be completely removed. The loss in small-scale features is undesirable and can be avoided through the use of the present invention. The geoid at points where ground tracks of different missions cross is the same for both missions. Thus, SSH changes at these points may be accurately observed.

The most serious error source contaminating the observed SSH change between separate altimeter missions is the Geographically Correlated Orbit Error (GCOE) of each satellite. This error is fixed for a given satellite. The GCOE at any point along an altimeter ground track is an integration of orbit solution errors (mainly due to gravity model errors) along the ground track up to that point. At a point where two ground tracks of a single satellite cross, the integral of errors along each track to the crossover point is different for the two tracks, and so the GCOE is different for the two tracks. Thus, crossover differences provide one method of measuring GCOE. However, certain spatial functions cannot be observed by crossover differences. For example, a constant bias error along all ground tracks produces no crossover differences.

SUMMARY OF THE INVENTION

The present invention removes the measurable portion of GCOE from satellite altimeter data, thereby allowing such data from independent satellite missions to be combined consistently. First, the GCOE structure for a reference data set is estimated through a crossover difference analysis. At the same time, the spatial GCOE structure that is not observable (and thus not removed) through the crossover analysis is determined. This improves upon prior approaches, which have not taken the unobservable GCOE into account.

The reference mean SL corrected for the observable GCOE is used as a reference surface for estimating the GCOE structure for altimeter data from an independent satellite mission (input data set). This is performed by examining the differences between the altimeter mean SL and the reference mean SL at the multimission crossover points. The resulting SSH differences at the multimission crossover points then leads to the SSH change between the reference data mission and the input data altimeter mission. This SSH change allows data from different input data altimeter missions to be used together.

In a first aspect, the present invention provides a system for generating reference sea level data. An apparatus embodying the system comprises a storage and a processor. The storage stores altimeter data for a plurality of intersecting ground tracks of an altimeter satellite. The processor computes the reference sea level data based on the altimeter data and a filtered normal mode decomposition generated by removing unmeasurable modes from a normal mode decomposition of estimated error for the altimeter data.

In a second aspect, the invention provides a system for observing changes in sea surface height over time. A method embodying the invention comprises removing error from altimeter data based on estimated error between the altimeter data and reference sea level data from which measurable error has been removed but one or more unmeasurable modes of error have not been removed. Differences are computed between the reference sea level data and the altimeter data after the removing of error from the reference sea level data.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 1 is a graph representing mean sea level (SL) along one satellite altimeter ground track;

FIG. 2A is a schematic map illustrating the T/P ground track pattern;

FIG. 2B is a schematic map corresponding to FIG. 2A and indicating multimission crossover points between Geosat-ERM ground tracks and T/P ground tracks;

FIG. 2C is a schematic map corresponding to FIG. 2A and indicating multimission crossover points between ERS-1 ground tracks and T/P ground tracks;

FIG. 3 is a graph illustrating the distribution of the T/P mean SL crossover differences before and after GCOE correction through crossover minimization;

FIG. 4 is a schematic map sequence showing the ascending and descending components of the first five modes of the T/P GCOE normal mode decomposition;

FIG. 5 is a graph of the first 20 eigenvalues of the least-squares matrix to solve the GCOE;

FIGS. 6A–6B are schematic maps respectively showing the T/P GCOE solution for ascending ground tracks and descending ground tracks;

DESCRIPTION OF THE PREFERRED EMBODIMENTS

Figure 7:
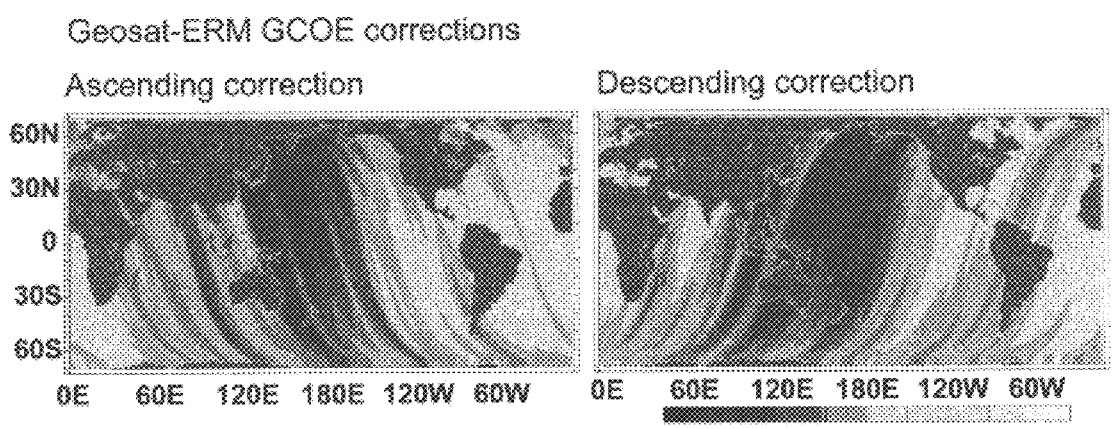
FIG. 7 is a pair of schematic maps showing the GCOE corrections as applied to the Geosat-ERM data set.

An example of the operation of the invention is presented first, and the details of the principle of operation are presented through the example. In this example, T/P data are used as the reference data set. Geosat-ERM data and ERS-1 data are independent altimeter mission input data sets to be analyzed according to the principles of the present invention. This invention allows these independent data sets to be combined consistently.

The consistent combination of satellite data in accordance with the principles of the invention may comprise several actions:

1. Correction of the altimeter data sets;
2. Development of the T/P mean SL over a 3 year time period;
3. Correction of the T/P mean SL for GCOE effects;
4. Development of the Geosat-ERM and ERS-1 mean SL over their respective time periods;
5. Removal of the GCOE of Geosat-ERM and ERS-1 by referencing to the T/P mean SL; and
6. Removing the T/P mean SL from the Geosat-ERM and ERS-1 mean SL to produce the SSH change.

T/P data over the time period 1993–1995 form the mean SL that serves as a reference for examining global SSH change between altimeter missions. After producing a mean SL along each T/P ground track, GCOE observable by crossover differences is removed by a least squares minimization of mean SL crossover differences. It is noted that the SSH changes (ΔSSH) from the Geosat-ERM to the T/P time period are zonally coherent across scales of 4000 km. This shows that the GCOE is sufficiently correctable by referencing to the T/P mean.

The least squares process used here is initially not solvable because of a set of unobservable modes with a particular spatial structure. The amplitude of these modes cannot be determined by the least squares process, so a solution is obtained by requiring the unobservable mode amplitudes to be zero. Thus, only a portion of the GCOE is removed by the crossover analysis, and the spatial structure of the portion not removed is indicated by the least squares analysis.

The T/P data are first broken into arcs, each composed of one satellite revolution beginning and ending at the satellite's southernmost extent (66° S). Arcs that fall on the same ground track are grouped into a set of repeat (or collinear) passes. Computed orbits for T/P are based on the JGM-3 gravity field. Atmospheric corrections (dry troposphere, wet troposphere, and ionosphere) are applied, as well as solid earth tides, an ocean tide estimate, tidal loading, an electromagnetic (EM) bias, and an inverse barometer correction. SSH from all repeat passes is interpolated along ground tracks to the same points spaced by 1 s (i.e., approximately 6.5 km along the track) through a second order polynomial interpolation.

The T/P SL at a crossover point is found by a second-order polynomial interpolation of the mean SL along the track to the crossover point. The histogram of crossover differences before removing the GCOE (see FIG. 3) indicates an RMS value of about 1.87 cm.

The GCOE estimate for each T/P ground track is modeled as a combination of four functions: a constant plus a linear trend in time plus a 1 cycle-per-revolution ("cpr") sinusoid with unknown cosine and sine coefficients. The amplitudes of these functions are estimated by a weighted least squares process that minimizes the total mean SL crossover differences along all the T/P ground tracks simultaneously.

There are certain combinations of the four functions used to model the GCOE for each ground track that are not measurable by crossover differences. For example, if the same constant function is added to the mean SL along each ground track, the crossover differences are not changed. Such an unobservable mode is a vector in the null space of the least squares process. There are additional free modes determined from the measurement scheme, and still other modes are badly measured by the crossover sampling.

The least squares process that estimates the amplitudes (x) of the functions required to minimize the crossover differences (y) is defined by $$H^T W H x = H^T W y, \quad (1)$$

where H is the design matrix of the problem (i.e., the ijth component of H is the jth function measured at the ith point). Note that only two of the 127 T/P ground tracks (each having four functions representing the GCOE) are measured at each crossover point, so each row of H has eight nonzero elements. In (1), W is the weighting matrix and is assumed to be diagonal. Each diagonal element of W is given by the reciprocal of the sum of the variance of the mean SSH of the two tracks at the measurement point.

Let $A = H^T W H$. In an eigenvalue decomposition of A, the matrix of the least squares process, the unobservable modes are eigenvectors with corresponding eigenvalues of zero. The unobservable modes' eigenvectors provide the combinations of the four functions for each track which result in no crossover differences. For example, the smallest eigenvalue of the matrix solved here has a corresponding eigenvector indicating that the constant function for each track has an equal magnitude and the other functions have zero amplitude for each track.

Spatial maps of the ascending and descending components of the first five modes (see FIG. 4) indicate that the first two modes have no crossover differences, and thus the first two modes are unobservable modes. These first two modes do not have eigenvalues exactly equal to zero because of numerical round-off errors, but the eigenvalues are 10 orders of magnitude smaller than the largest eigenvalue.

Mode numbers 3 and 4 have eigenvalues that are two orders of magnitude less than the next modes and four orders of magnitude less than the largest eigenvalue (see FIG. 5). From an examination of the eigenvalues, we determine that even though modes 3 and 4 are not technically unobservable modes, they are badly measured modes. Noise in the measurements (the mean SL crossover) can produce unreasonably large amplitudes in such badly measured modes. This can be seen through the solution of (1).

Consider the matrix A is written in terms of its eigenvalue decomposition: $A = \Lambda^T \lambda \Lambda$, where $\Lambda$ contains the eigenvectors of A as columns and $\lambda$ is a diagonal matrix of eigenvalues. The solution of (1) is then written as $$x = \Lambda^T \lambda^{-1} z, \quad (2)$$

where $z = \Lambda H^T W y$. In (2), each eigenvector (i.e., each column of $\Lambda$) is divided by its corresponding eigenvalue.

If an eigenvalue is very small, noise in y will be amplified in the eigenmode. To avoid this effect, such small-eigenvalue modes are excluded from the solution by setting the corresponding elements of $\lambda^{-1}$ to 0. This is analogous to the Moore-Penrose inverse. Normally the matrix A is not invertible, and the least squares process does not have a unique solution because A is positive indefinite. Exclusion of the free and badly measured modes results in additional constraints which make the problem solvable. As mentioned above, the first four modes of FIG. 4 are determined to be free and badly measured modes, while the fifth and subsequent modes are not.

The T/P GCOE solution is shown in FIG. 6. The histogram of crossover differences after GCOE correction is plotted in FIG. 3. The RMS crossover difference decrease from 1.87 cm (prior to GCOE correction) to 1.42 cm RMS (after correction) implies a GCOE crossover error of about 1.22 cm RMS and a corrected mean SL accuracy of 1 cm RMS. Thus, the GCOE itself implies an orbit error of about 0.86 cm RMS, which is within expected values.

To observe SSH changes between altimeter missions, data from the Geosat-ERM and ERS-1 altimeter satellites were used. Both data sets are processed similarly. Atmospheric corrections (dry troposphere, wet troposphere, and ionosphere) are applied, as well as solid and ocean tide estimates, an EM bias correction of 2.5% of the significant wave height, and a static inverse barometer correction. Both the Geosat-ERM and ERS-1 orbit solutions are based on the JGM-3 gravity model.

Significant time-varying orbit errors exist in the Geosat-ERM and ERS-1 data. Because the Geosat-ERM and ERS-1 contain large time-varying orbit errors, a time-varying, long wavelength orbit error estimate (modeled as a constant plus a linear trend in time and a sinusoid with 1 cpr frequency) is removed from each repeat pass of Geosat-ERM and ERS-1 data by a weighted least squares method. The one revolution cutoff for the arc length is chosen so that the arc is long enough to well determine the orbit error and short enough so that the orbit error parameters may be assumed constant over the arc. The estimated time-varying orbit error is then removed from each repeat pass of SSH. The process to remove the time-varying orbit error does nothing to change the mean SSH or the GCOE of the Geosat-ERM or ERS-1.

To estimate the GCOE of the Geosat-ERM and ERS-1, the total of the mean SL differences to the T/P reference mean at the multimission crossover points is minimized separately for each track composed of one satellite revolution. This process only corrects the mean of the Geosat-ERM and ERS-1. The SSH anomalies about the mean are not changed. The GCOE of the Geosat-ERM and ERS-1 are modeled as a linear trend in time plus frequencies from 1 to 4 cpr and are removed (see FIGS. 7 and 8).

After removing the GCOE, the T/P SL reference mean is subtracted from the Geosat-ERM and ERS-1 mean SL at the multimission crossover points. As SL due to the geoid is the same at multimission crossover points, the remaining Geosat-ERM and ERS-1 anomalies are SSH anomalies to the mean SSH over the T/P reference time period.

To demonstrate that SSH variations are observable through this method, ERS-1 and T/P data over the same one-year time period were used, and the SSH anomalies relative to the T/P reference mean were observed. The ERS-1 data are useful only at the multimission crossover points, since the T/P reference mean may be used with the ERS-1 data only at these crossover points. However, the T/P reference mean may be used with the T/P data at all ground track points. Thus, the ERS-1 data are used through the multimission crossover analysis, and the T/P data are used through the single-satellite collinear analysis.

Figure 9:
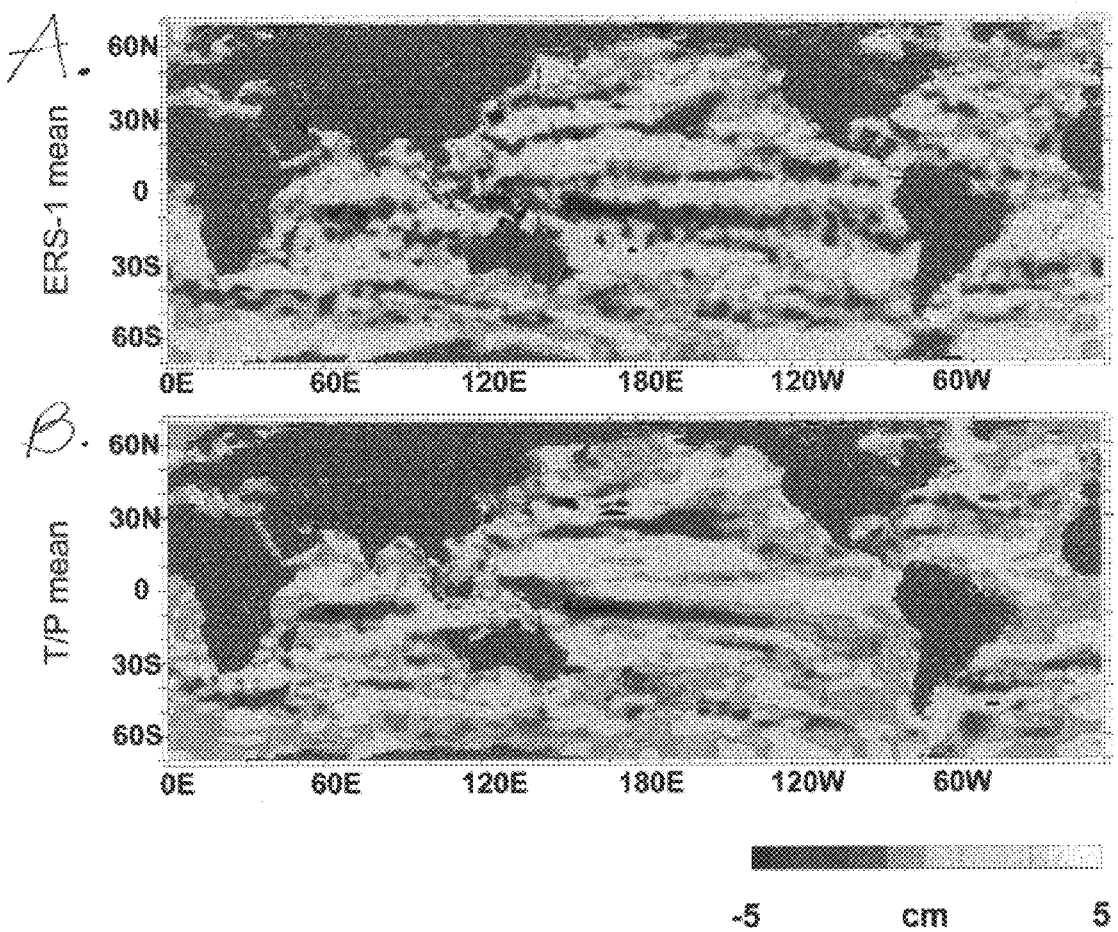
FIG. 9A is a schematic map of the ERS-1 SL anomalies to the T/P reference mean averaged over the one-year time period from Dec. 1, 1992, through Nov. 30, 1993.
FIG. 9B is a schematic map corresponding to FIG. 9A and showing the T/P anomalies to the T/P reference mean averaged over the same one-year period.

The ERS-1 SL anomalies to the T/P reference mean were averaged over the time period from Dec. 1, 1992, through Nov. 30, 1993 (see FIG. 9A). The T/P anomalies to the T/P reference mean were averaged over the same time period (see FIG. 9B). Frequencies from 1 cpr to 4 cpr were removed from the T/P reference mean to remove GCOE as well as differences in water vapor corrections, as explained in greater detail below. For consistency, sinusoids with frequencies from 1 to 4 cpr were removed from the one-year-averaged T/P SSH anomaly. Zonally coherent anomalies are well correlated between the two results. Thus, the ERS-1 mean SL is referenced to the common mean SL provided by the three years of T/P.

It is noted that the bias between the Geosat-ERM and T/P (28 cm) and between ERS-1 and T/P (44 cm) is based on T/P data which was not corrected for oscillator drift algorithm error. It can be concluded that correction for this error would reduce the bias between T/P and the other satellites by 13 cm. See R. S. Nerem, *Global Mean Sea Level Change: Correction*, SCIENCE vol. 275, p. 1053 (1997).

Figure 10:
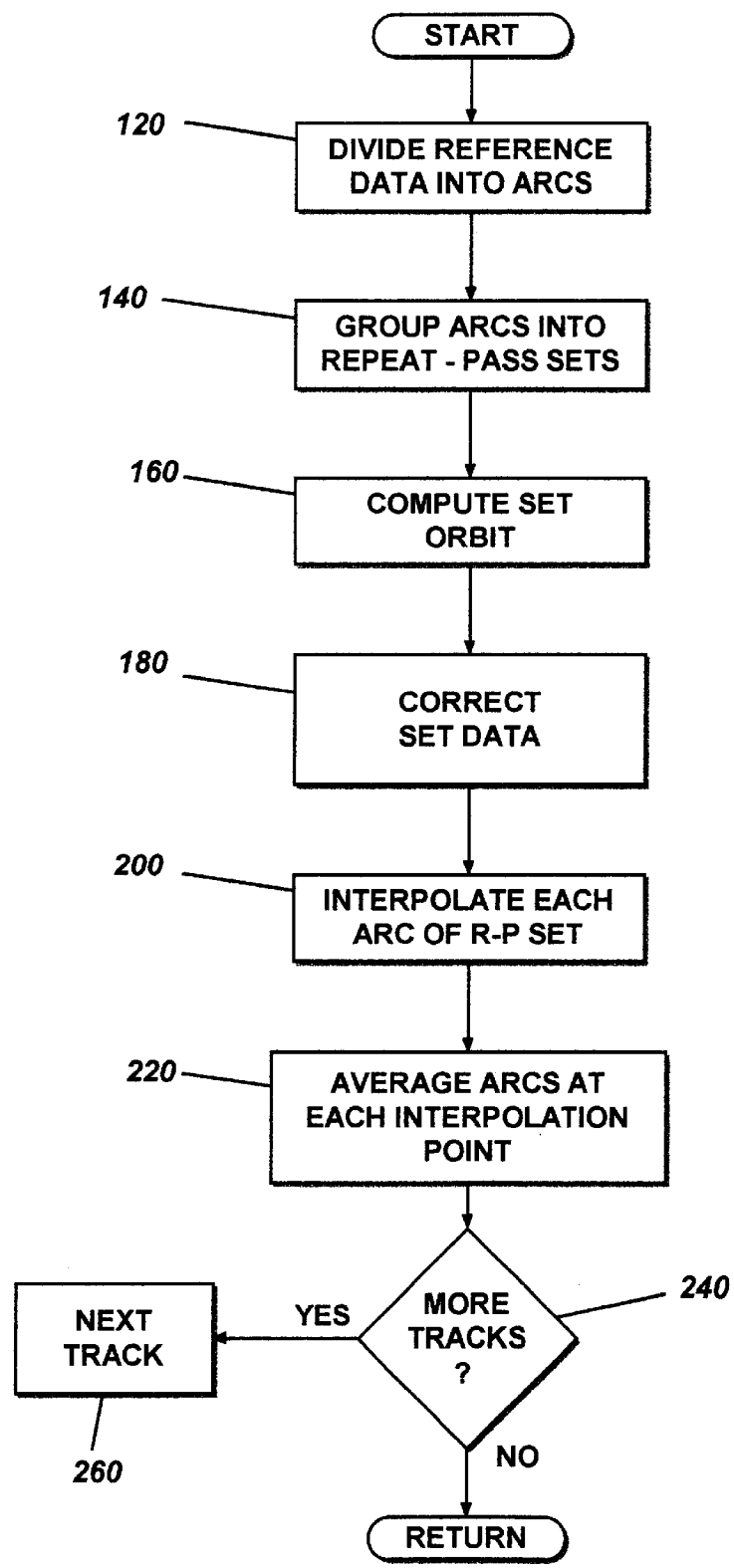
FIG. 10 is a flow chart illustrating a procedure for preparation of satellite altimeter data to be processed according to the present invention.

FIGS. 10—13 illustrate an example of a method embodying the principles of the present invention as described above. FIG. 10 shows a flow chart for a first stage in carrying out this method. The reference data set is first divided into single-revolution arcs at block 120. These arcs are then grouped into repeat-pass sets at block 140. This grouping operation arranges the arcs so that all of the arcs in a given set follow the same ground track. Each of the repeat-pass sets are then processed to generate a mean sea level (SL) data set at intramission crossover points.

First, at block 160, the orbit of the repeat-pass set is computed or input from previously-computed data. Corrections are then applied to the repeat-pass data at block 180 as described above, i.e., atmospheric corrections, solid earth and ocean tide estimates, tidal loading, EM bias, and inverse barometric correction. At block 200, SL along each arc is interpolated at predetermined intervals, e.g., at 1 s intervals as described above. The SL values of the arcs in the repeat-pass set are then averaged at each interpolation point at block 220. A mean SL is thereby generated for the interpolation points on the ground track of the repeat-pass set.

At block 240 the procedure determines whether repeat-pass sets corresponding to more tracks remain to be corrected. If so, then at block 260 the repeat-pass set for the next track is addressed, and the procedure goes back to block 160. If no more tracks remain at block 240, then the procedure returns.

Figure 11A:
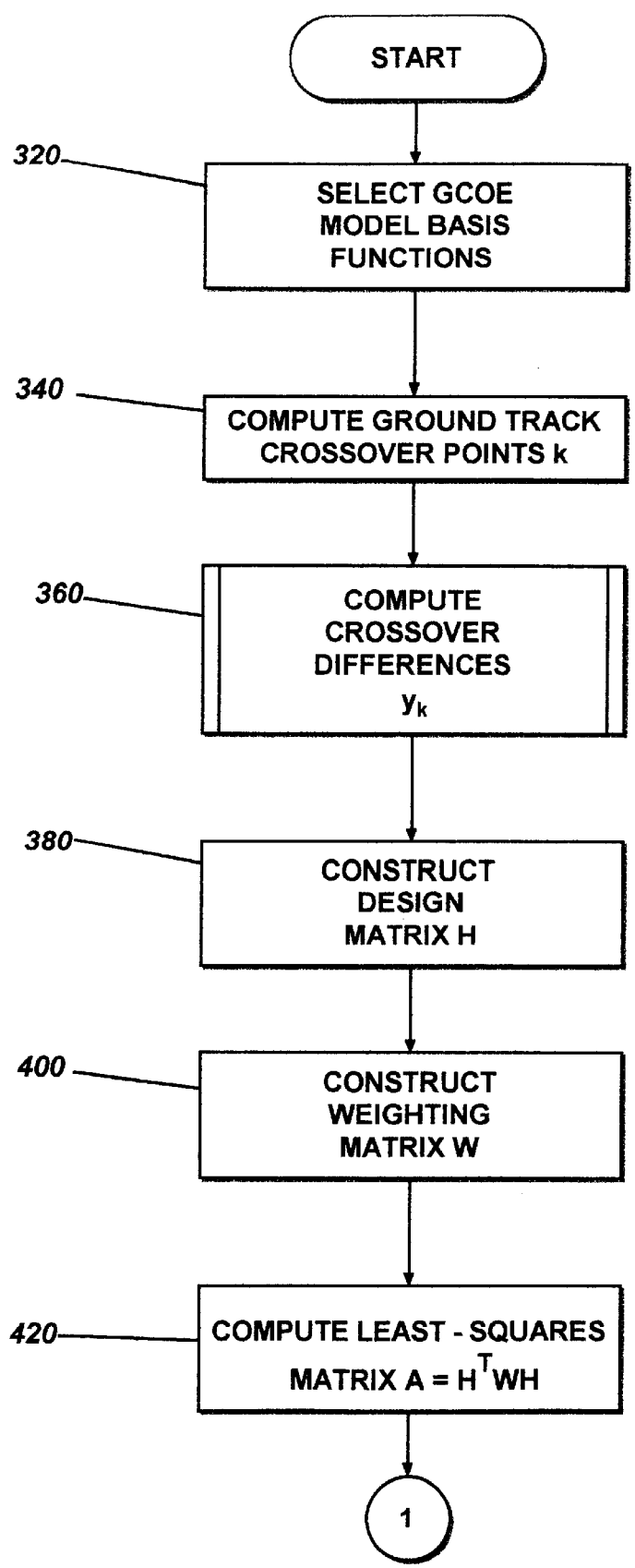
FIGS. 11A–11B show a flow chart illustrating a method of computing a reference mean sea level from a reference data set according one embodiment of the present invention.
Figure 11B:
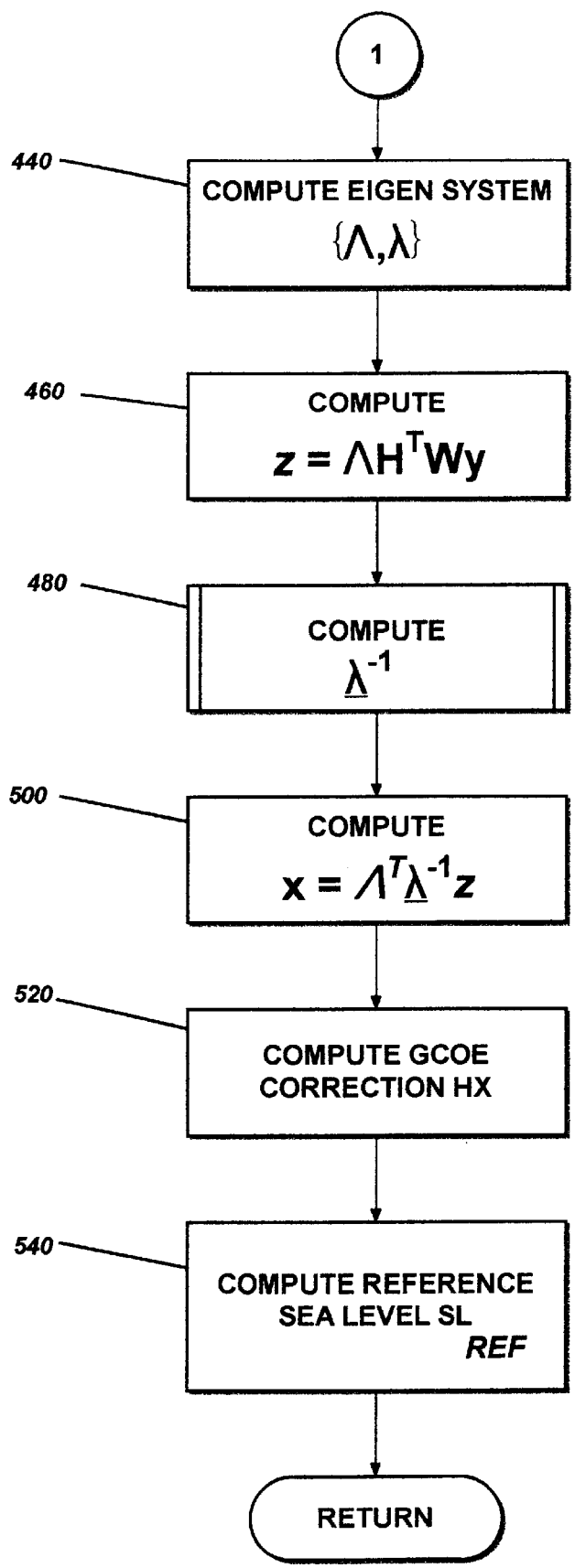
Figure 12:
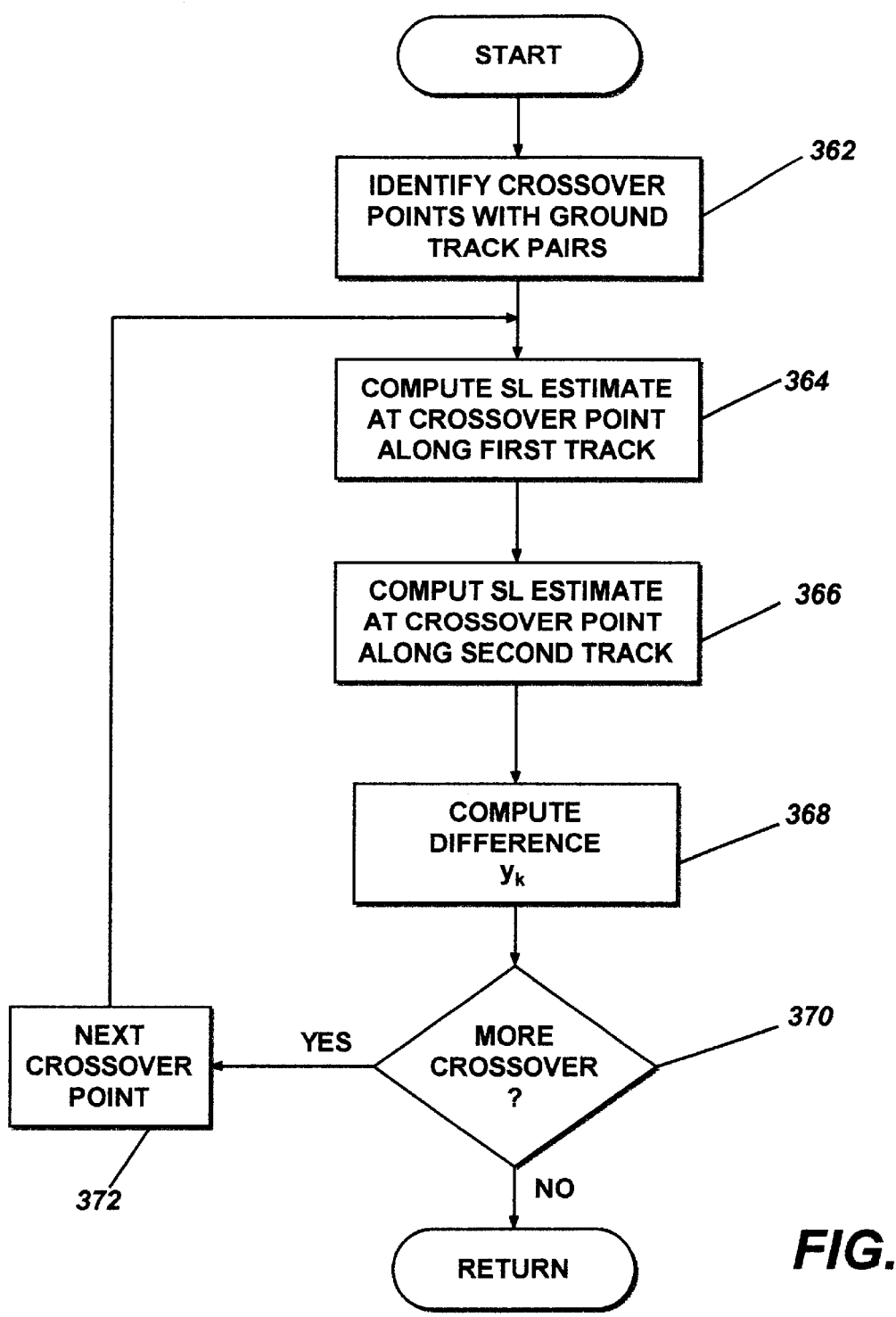
FIG. 12 is a flow chart illustrating the details of computing crossover differences in the method illustrated in FIGS. 11A–11B.

FIGS. 11A and 11B show a flow chart of a process for removing the observable portion of the GCOE from the mean SL to generate a reference sea level data set, $SL_{REF}$. Initially, at block 320, a set of basis functions to model the GCOE of the reference data set is selected. Such model basis functions can be predetermined, such as the four functions used in the example presented above: constant, linear trend in time, 1 cpr cosine, and 1 cpr sine. Alternatively, other suitable basis functions can be selected and input to the method according to particular features of the reference data set.

Ground track crossover points are computed at block 360 for the ground tracks of the reference data set. These are intra-mission crossover points, i.e., points at which different ground tracks from the same satellite mission cross. These crossover points are used to compute crossover differences $y_k$ as described by the flow chart shown in FIG. 12.

First, at block 362, crossover points are identified for each pair of ground tracks that cross. For each such ground track pair, an estimated mean SL value is computed at the crossover point for each of the ground tracks of the pair (blocks 364 and 366). These estimated SL values are computed by a suitable estimation method, such as second-order polynomial interpolation along the ground track, as described in the example above. The crossover difference $y_k$ for the crossover point is then computed at block 368 as the difference between the two estimated SL values.

This process is repeated for each of the crossover points of the reference data set. At block 370 it is determined whether more crossover points remain for processing. If so, then the next crossover point is addressed at block 372, and the procedure goes back to block 364. If no more crossover points remain, then the procedure of FIG. 12 returns.

Returning to FIG. 11A, an N×M design matrix H is then constructed at block 380 using the model basis functions for each of the ground tracks, each function being evaluated at each of the crossover points. Here N is the number of crossover points, and M is the product of the number of ground tracks and the number of model basis functions used to model the GCOE. For example, the T/P data set described above has 127 ground tracks, and four model basis functions were used in the example analysis.

A weighting matrix W is also constructed at block 400. In a preferred embodiment of the method, W is diagonal with $w_{kk}$ being computed as the reciprocal of a sum. This sum is computed by adding together the variances of the mean SSH of the two tracks at the crossover point k.

A least-squares model matrix A is then computed at block 420 from H and W, according to $A=H^T W H$. At block 440 (FIG. 11B), a normal mode decomposition of A is then performed to generate the eigensystem $\{\Lambda,\lambda\}$. The columns of the matrix $\Lambda$ represent the normal mode variations of the GCOE. The GCOE represented in the reference data set is comprised of a linear combination of these normal modes. Various eigenvalue-eigenvector decomposition packages are available to perform the eigensystem generation, such as EISPACK. At block 460 the intermediate vector z is computed according to $z=\Lambda H^T W y$, where y is the vector of crossover differences.

Figure 13:
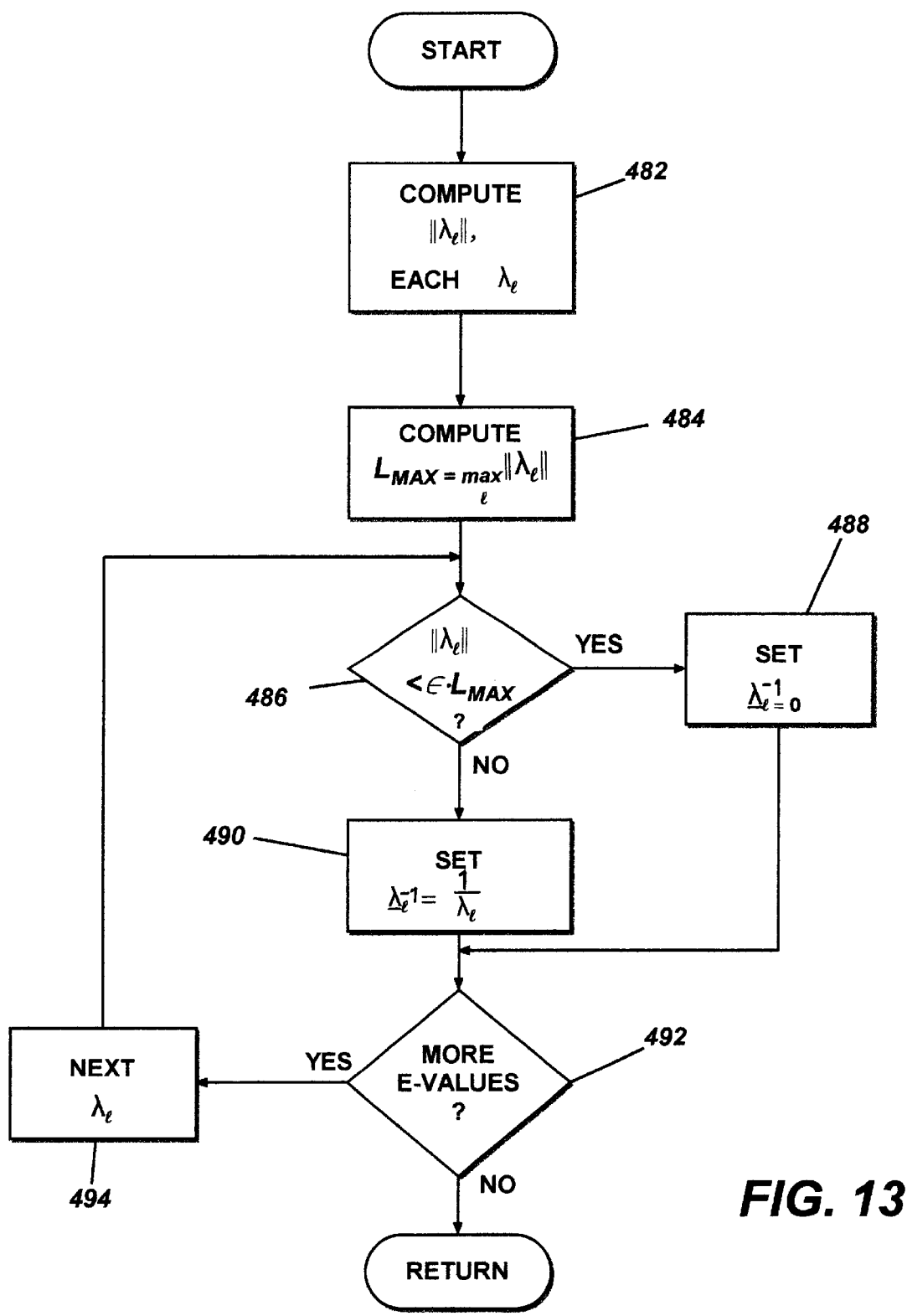
FIG. 13 is a flow chart illustrating the details of computing the filtered inverse eigenvalue matrix $\lambda^{-1}$ in the method illustrated in FIGS. 11A–11B.

A filtered inverse eigenvalue matrix $\lambda^{-1}$ is then generated at block 480. The unobservable and badly measured modes (collectively, "unmeasurable modes") are filtered out in a process as illustrated in FIG. 13. First, at block 482, the norm $\|\lambda_l\|$ of each eigenvalue $\lambda_1$ is computed. For the unobservable modes, $\lambda_l=0$. A maximum value $L_{MAX}$ is determined as the maximum of the computed norms at block 484. Each norm $\|\lambda_l\|$ is then compared at block 486 with the product of $L_{MAX}$ and a predetermined threshold value $\epsilon$. A value of $\epsilon$ is selected to ensure that the unmeasurable modes are filtered out. The value of $\epsilon$ may be selected as $10^{-2}$, for example, so that normal modes are filtered out when associated with eigenvalues smaller than two orders of magnitude less than the largest eigenvalue in norm. Alternatively, $\epsilon$ may be set at, for example, $10^{-1}$. For those modes for which $\|\lambda_l\|<\epsilon\cdot L_{MAX}$, the value $(\lambda^{-1})_l$ is set to zero at block 488. Otherwise, $(\lambda^{-1})_l$ is set to $1/\lambda_l$ at block 490. Block 492 determines whether more eigenvalues remain for the filtering process. If so, then the next eigenvalue is addressed at block 494 and the procedure goes back to block 486. If no more eigenvalues remain to be filtered at block 492, then the procedure of FIG. 13 returns.

This thresholding process ensures that both the unobservable and the badly measured modes are filtered out from the GCOE modal representation. Alternatively, modes to be filtered out as unmeasurable can be individually selected according to a predetermined selection criterion..

Returning to FIG. 11B, at block 500 the vector x of basis function coefficients for the observable GCOE is computed as $x = \Lambda^T \lambda^{-1} z$. A GCOE correction Hx that excludes the unmeasurable modes is then computed at block 520. The reference sea level $SL_{REF}$ is computed at block 540, whereupon the procedure of FIGS. 11A and 11B returns.

Figure 8:
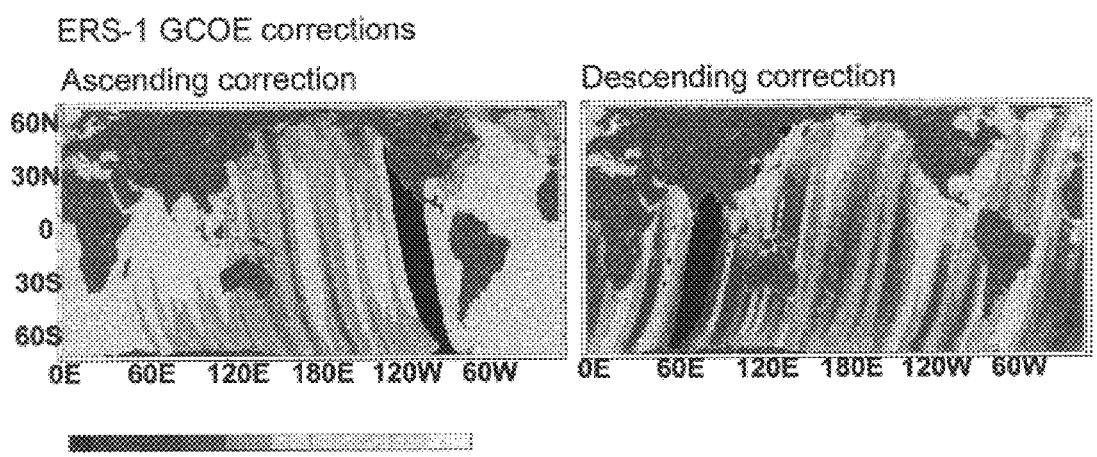
FIG. 8 is a pair of schematic maps showing the GCOE corrections as applied to the ERS-1 data set.

In a specific implementation, the basic procedure outlined above is applied to examine the GCOE energy contained within particular frequency bands. First, the GCOE for the satellite data (e.g., Geosat-ERM or ERS-1) is modeled as a linear trend in time plus a 1 cpr sinusoid. The GCOE corrections are shown in FIGS. 7 and 8 for Geosat-ERM and ERS-1, respectively. To obtain the energy at 2 cpr, the GCOE is modeled as a linear trend plus 1 and 2 cpr sinusoids. The GCOE solution using a linear trend and only a 1 cpr fit is then subtracted. The GCOE at 3 and 4 cpr is calculated by modeling the GCOE as a linear trend plus sinusoids from 1 to 4 cpr, then subtracting the GCOE obtained by using a linear trend and 1 and 2 cpr sinusoids.

The solutions obtained in this specific implementation have been called "GCOE" in the foregoing discussion. However, the actual GCOE is principally 1 cpr, and higher-frequency solutions are correlated to the changes in atmospheric corrections (particularly water vapor). Therefore, it is expected that the 1 cpr GCOE solution is mainly due to the actual GCOE in the Geosat-ERM and ERS-1 orbit solutions. The higher-frequency estimates, on the other hand, are actually atmospheric errors.

Figure 14:
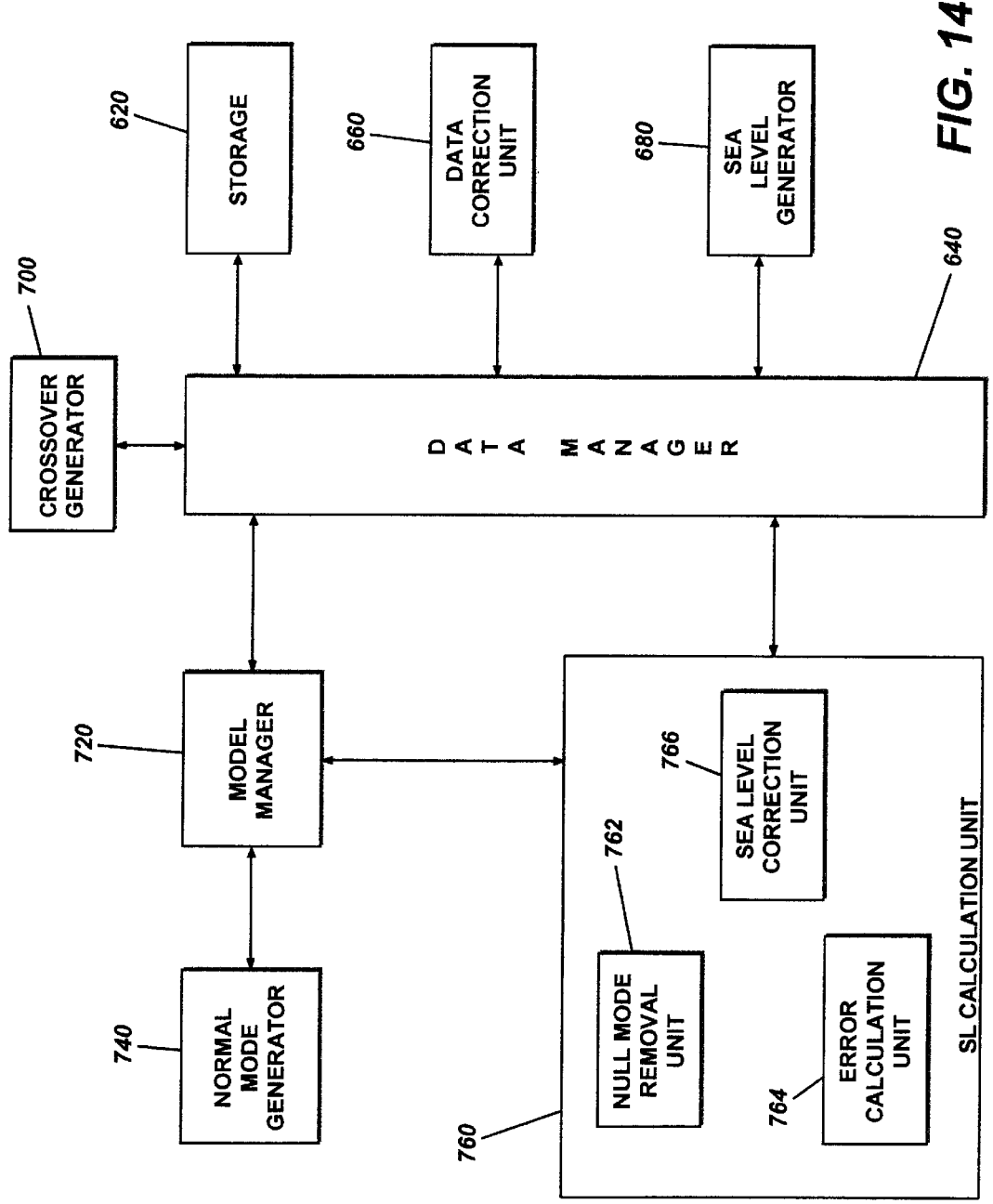
FIG. 14 is a block diagram illustrating an example of an apparatus constructed according to another embodiment of the present invention.

FIG. 14 shows an apparatus providing an example of a second embodiment of the present invention. Preferably this apparatus is implemented as a programmed digital computer. In a typical case, the computer will comprise a large-scale array processing facility, which may be implemented through several processing units operating in parallel. The apparatus may be conveniently divided into several functional units. As illustrated in FIG. 14, these functional units can be embodied as separate processing devices or program units. Alternatively, several of such functional units can be subsumed into a larger functional block.

The apparatus of FIG. 14 operates substantially according to the method illustrated in FIGS. 10–13. As mentioned previously, the functions of this apparatus may be implemented in software, in a preferred configuration, or in an alternative configuration partly or completely in hardware.

As illustrated in FIG. 14, a storage 620 stores the reference data set to be processed, the result $SL_{REF}$, and optionally stores intermediate results generated in the carrying out the method of FIGS. 10–13. A data manager 640 divides the reference data set into arcs and groups the arcs into repeat-pass sets. The data manager 640 may also compute the orbits corresponding to the repeat-pass sets. Alternatively, precomputed orbits are retrieved from the storage 620.

A data correction unit 660 performs the operations to correct the reference data set as described above with respect to FIG. 10. A sea level generator 680 receives the corrected data, generates interpolation points for each arc of each repeat-pass set, and averages the arcs of each repeat-pass set at each interpolation point. The averaged sea level values at the interpolation points are output as the mean SL.

A crossover generator 700 computes the crossover points and identifies crossover points with ground track pairs. Optionally, these data can be precomputed and retrieved from the storage. For each crossover point, the crossover generator 700 then computes the estimated SL values along each track of the pair and computes the difference $y_k$ from the estimated SL values.

The GCOE model basis functions are retrieved from the storage 620 by the data manager 640, or alternatively are input to the data manager 640. A model manager 720 inputs the basis functions and assembles matrices H, W, and A. A is then passed to a normal mode generator 740, which implements an eigenvector-eigenvalue decomposition process as described above. The eigensystem $\{\Lambda,\lambda\}$ is returned to the model manager 720 by the normal mode generator 740, and the model manager 720 in turn passes the eigenvalue matrix $\lambda$ to the filtering process shown in FIG. 13, which may be implemented in a SL calculation unit 760.

The SL calculation unit 760 includes a null mode removal unit 762 that filters out the unmeasurable modes as described above with respect to FIG. 13. An error calculation unit 764 computes the observable GCOE correction Hx as described above with reference to FIG. 11B. Alternatively, the error calculation unit 764 can be incorporated in the model manager 720. A sea level correction unit 766, which also can be incorporated into the model manager 720, uses the calculated GCOE correction to generate the reference sea level $SL_{REF}$. $SL_{REF}$ is then output to the data manager 640 and optionally stored in storage 620.

A comparison of mean changes in data corrections ($\Delta$CORR), applied to the T/P and ERS-1 data, was performed to determine if observed $\Delta$SSH is significantly influenced by instrument correction errors. Observed $\Delta$SSH could be partially contaminated by differences in the environmental and instrumental corrections applied to the different altimeter sets. Different instruments, processing methods, and processing groups can all contribute to what could be misinterpreted as changes in SSH. The present invention allows the corrections applied to the altimeter to be examined and to be compared to the observed $\Delta$SSH. Such comparison has shown that the majority of the signal present in the $\Delta$SSH for particular data sets (Geosat-ERM and ERS-1) is not correlated to changes in corrections ($\Delta$CORR).

To perform such comparisons, four principal corrections were extracted from the data records for the Geosat-ERM, ERS-1, an T/P missions: wet troposphere, dry troposphere, ionosphere, and EM bias. These four principal corrections for ERS-1 and T/P were differenced to produce $\Delta$CORR and the global average of each correction difference was removed. Comparison of $\Delta$CORR to $\Delta$SSH for the ERS-1 data, for example, revealed a lack of correlation indicating that $\Delta$SSH is not severely contaminated by changes in environmental or instrumental corrections.

These comparisons have yielded the following observation regarding the present invention. For ERS-1, the wet troposphere correction contained the largest differences in corrections. The T/P wet troposphere correction was based on an onboard water vapor radiometer, while the ERS-1 correction was based on data from the Special Sensor Microwave Imager (SSM/I). It was found that the high-frequency GCOE corrections for ERS-1 indicated some of the same spatial pattern as the wet troposphere correction difference.

The GCOE at the higher frequencies (2–4 cpr) was therefore biased by the difference in the wet troposphere correction. The effect of the wet troposphere correction difference was found to be reduced in the $\Delta$SSH, because the GCOE estimation had absorbed a portion of this error. In other words, the high-frequency GCOE estimation provided by the present invention was found to reduce the errors in the wet troposphere correction.

Additional information concerning the present invention can be found is the source code of the attached Appendix and the article by G. A. Jacobs and J. L. Mitchell, *Combining Multiple Altimeter Missions*, J. GEOPHYSICAL RES., vol. 102, no. C10 at 23,187–23,206 (Oct. 15, 1997), both of which are incorporated by reference herein.

Although a few preferred embodiments of the present invention have been shown and described herein, it will be appreciated by those of skill in the art that changes may be made in these embodiments without departing from the principles and spirit of the invention, the scope of which is defined by the claims below and equivalents of the subject matter defined therein.

APPENDIX

1. COMPUTER SOURCE CODE
2. ARTICLE: G. A. Jacobs and J. L. Mitchell, *Combining Multiple Altimeter Missions*, J. GEOPHYSICAL RES., vol. 102, no. C10 at 23,187–23,206 (Oct. 15, 1997)

What is claimed is:

1. An apparatus for generating reference sea level datum for every point along the satellite ground tracks, said apparatus comprising:
   a storage for storing altimeter data collected along a plurality of intersecting ground tracks from more than one altimeter satellite at different times; and
   a processor for computing reference sea level datum for every point along the plurality of altimeter ground tracks, wherein said reference sea level values are based on the altimeter data and a filtered normal mode of decomposition that is generated by removing unmeasured modes from a normal mode decomposition of estimated error for the altimeter data.

2. An apparatus as recited in claim 1, wherein the estimated error includes for each ground track a linear combination of a predetermined set of basis functions, the linear combinations minimizing differences between the estimated error and crossover differences of the altimeter data at crossover points of the ground tracks.

3. An apparatus as recited in claim 1, wherein said processor filters the normal mode decomposition by identifying one or more normal modes thereof as unmeasurable modes and removing each identified normal mode from the normal mode decomposition when the one or more normal modes have corresponding eigenvalues satisfying a predetermined threshold condition in norm.

4. An apparatus as recited in claim 1, wherein said processor filters the normal mode decomposition by generating a norm for each eigenvalue of the normal mode decomposition, comparing each norm to a specified threshold value, and removing a normal mode corresponding to an eigenvalue from the normal mode decomposition when the norm of the eigenvalue is less than the specified threshold value.

5. An apparatus as recited in claim 4, wherein the specified threshold value is a predetermined fraction of a largest one of the norms generated for the normal mode decomposition.

6. An apparatus as recited in claim 2, wherein the estimated error corresponds to least squares minimization of the differences between the estimated error and the crossover differences.

7. An apparatus as recited in claim 1, further comprising an eigensystem generator generating the normal mode decomposition.

8. An apparatus as recited in claim 1, wherein said apparatus receives, the normal mode decomposition from a device attached to said apparatus.

9. An apparatus as recited in claim 1, wherein said processor comprises:
   a null mode removal unit generating the filtered normal mode decomposition from the normal mode decomposition;
   an error calculation unit calculating error correction data based on the filtered normal mode decomposition; and
   a correction unit generating the reference sea level data based on the altimeter data and the error correction data.

10. An apparatus as recited in claim 1, further comprising a crossover generator calculating from the altimeter data a crossover difference for each of a plurality of crossover points at which pairs of the ground tracks respectively intersect.

11. An apparatus as recited in claim 2, wherein:
    said processor retrieves from said storage a plurality of crossover points at which pairs of the ground tracks respectively intersect; and
    said processor calculates from the altimeter data, for each of the crossover points, a difference between mean sea level values for the corresponding pair of ground tracks at the crossover point and designates the difference as the crossover difference for the crossover point.

12. An apparatus as recited in claim 2, wherein said processor calculates the estimated error by performing least-squares minimization of the differences between the estimated error and the crossover differences.

13. An apparatus as recited in claim 1, wherein:
    said processor generates a least-squares minimization matrix for the estimated error based on a plurality of crossover points at which corresponding pairs of the ground tracks respectively intersect; and
    said processor generates the normal mode decomposition from the least-squares minimization matrix using an eigenvalue-eigenvector decomposition process.

14. An apparatus as recited in claim 13, wherein said processor generates the least-squares minimization matrix based on a predetermined set of basis functions for each of the ground tracks, each set of basis functions including a linear function in time, a cosine function having a predetermined frequency, and a sine function having a predetermined frequency.

15. An apparatus as claimed in claim 13, wherein said processor generates the least-squares minimization matrix based on a predetermined set of basis functions for each of the ground tracks, each set of basis functions including a linear function in time, a one cycle-per-revolution cosine function, and a one cycle-per-revolution sine function.

16. An apparatus as recited in claim 15, wherein each set of basis functions further includes a two cycle-per-revolution cosine function and a two cycle-per-revolution sine function.

17. An apparatus as recited in claim 1, wherein said processor corrects the altitude data according to a predetermined correction process before computing the reference sea level data, the predetermined correction process including at least one of an atmospheric correction, a solid earth tide correction, an ocean tide correction, a tidal loading correction, an electromagnetic bias correction, and an inverse barometric correction.

18. A method for generating reference sea level data, the method comprising:
    storing altimeter data collected along a plurality of intersecting ground tracks from more than one altimeter satellite at different times; and
    computing reference sea level datum for every point along the plurality of altimeter ground tracks, wherein said reference sea level values are based on the altimeter data and a filtered normal mode of decomposition that is generated by removing unmeasured modes from a normal mode decomposition of estimated error for the altimeter data.

19. A method as recited in claim 18, wherein the estimated error includes for each ground track a linear combination of a predetermined set of basis functions, the linear combinations minimizing differences between the estimated error and crossover differences of the altimeter data at crossover points of the ground tracks.

20. A method as recited in claim 18, wherein the computing operation includes filtering the normal mode decomposition by identifying one or more normal modes thereof as unmeasurable modes and removing each identified normal mode from the normal mode decomposition when the one or more normal modes have corresponding eigenvalues satisfying a predetermined threshold condition in norm.

21. A method as recited in claim 18, wherein the computing operation includes filtering the normal mode decomposition by generating a norm for each eigenvalue of the normal mode decomposition, comparing each norm to a specified threshold value, and removing a normal mode corresponding to an eigenvalue from the normal mode decomposition when the norm of the eigenvalue is less than the specified threshold value.

22. A method as recited in claim 21, wherein the specified threshold value is a predetermined fraction of a largest one of the norms generated for the normal mode decomposition.

23. A method as recited in claim 19, wherein the estimated error corresponds to least squares minimization of the differences between the estimated error and the crossover differences.

24. A method as recited in claim 18, wherein the computing operation comprises:
generating the filtered normal mode decomposition from the normal mode decomposition;
calculating error correction data based on the filtered normal mode decomposition; and
generating the reference sea level data based on the altimeter data and the error correction data.

25. A method as recited in claim 18, further comprising calculating from the altimeter data a crossover difference for each of a plurality of crossover points at which pairs of the ground tracks respectively intersect.

26. A method as recited in claim 19, wherein:
the method further comprises retrieving from a storage a plurality of crossover points at which pairs of the ground tracks respectively intersect; and
the calculating operation comprises calculating from the altimeter data, for each of the crossover points, a difference between mean sea level values for the corresponding pair of ground tracks at the crossover point and designates the difference as the crossover difference for the crossover point.

27. A method as recited in claim 19, wherein the calculating operation comprises calculating the estimated error by performing least-squares minimization of the differences between the estimated error and the crossover differences.

28. A method as recited in claim 18, wherein the calculating operation comprises:
generating a least-squares minimization matrix for the estimated error based on a plurality of crossover points at which corresponding pairs of the ground tracks respectively intersect; and
generating the normal mode decomposition from the least-squares minimization matrix using an eigenvalue-eigenvector decomposition process.

29. A method as recited in claim 28, wherein generating the least-squares minimization matrix is further based on a predetermined set of basis functions for each of the ground tracks, each set of basis functions including a linear function in time, a cosine function having a predetermined frequency, and a sine function having a predetermined frequency.

30. A method as claimed in claim 28, wherein generating the least-squares minimization matrix is further based on a predetermined set of basis functions for each of the ground tracks, each set of basis functions including a linear function in time, a one cycle-per-revolution cosine function, and a one cycle-per-revolution sine function.

31. A method as recited in claim 30, wherein each set of basis functions further includes a two cycle-per-revolution cosine function and a two cycle-per-revolution sine function.

32. Method as recited in claim 18, wherein the calculating operation comprises correcting the altitude data according to a predetermined correction process before computing the reference sea level data, the predetermined correction process including at least one of an atmospheric correction, a solid earth tide correction, an ocean tide correction, a tidal loading correction, an electromagnetic bias correction, and an inverse barometric correction.

33. A computer readable medium encoded with program instructions for generating reference sea level data, said program instructions comprising instructions for:
storing altimeter data collected along a plurality of intersecting ground tracks from more than one altimeter satellite at different times; and
computing reference sea level datum for every point along the plurality of altimeter ground tracks, wherein said reference sea level values are based on the altimeter data and a filtered normal mode of decomposition that is generated by removing unmeasured modes from a normal mode decomposition of estimated error for the altimeter data.

34. A computer readable medium as recited in claim 33, wherein said instructions for computing the reference sea level data include instructions for filtering the normal mode decomposition by identifying one or more normal modes thereof as unmeasurable modes and removing each identified normal mode from the normal mode decomposition when the one or more normal modes have corresponding eigenvalues satisfying a predetermined threshold condition in norm.

35. A computer readable medium as recited in claim 33, wherein said instructions for computing the reference sea level data include instructions for filtering the normal mode decomposition by generating a norm for each eigenvalue of the normal mode decomposition, comparing each norm to a specified threshold value, and removing a normal mode corresponding to an eigenvalue from the normal mode decomposition when the norm of the eigenvalue is less than the specified threshold value.

36. A computer readable medium as recited in claim 33, wherein said instructions for computing the reference sea level data comprise instructions for:
generating the filtered normal mode decomposition from the normal mode decomposition;
calculating error correction data based on the filtered normal mode decomposition; and
generating the reference sea level data based on the altimeter data and the error correction data.

37. A computer readable medium as recited in claim 33, wherein said program instructions further comprise instructions for calculating from the altimeter data a crossover difference for each of a plurality of crossover points at which pairs of the ground tracks respectively intersect.

38. A computer readable medium as recited in claim 34, wherein:

said program instructions further comprise instructions for retrieving from a storage a plurality of crossover points at which pairs of the ground tracks respectively intersect; and said instructions for calculating the reference sea level data comprise instructions for calculating from the altimeter data, for each of the crossover points, a difference between mean sea level values for the corresponding pair ground tracks at the crossover point and designating the difference as the crossover difference for the crossover point.

39. A computer readable medium as recited in claim 33, wherein said instructions for calculating the reference sea level data comprise instructions for:

generating a least-squares minimization matrix for the estimated error based on a plurality of crossover points at which corresponding pairs of the ground tracks respectively intersect; and generating the normal mode decomposition from the least-squares minimization matrix using an eigenvalue-eigenvector decomposition process.

40. An apparatus for consistently combining altimeter data from multiple satellites by reference to sea level data, the method comprising:

a model manager generating a least-squares matrix corresponding to estimation of crossover differences at crossover points of ground track pairs for the altimeter data by least-squares minimization, each crossover difference being a difference between sea level values indicated by the altimeter data at the crossover point along respective ground tracks of a corresponding pair of ground tracks; and a null mode removal unit filtering a normal mode decomposition of the least-squares matrix to remove unmeasurable modes therefrom, the unmeasurable modes having corresponding eigenvalues less in norm than selected multiple of a maximum eigenvalue norm of the normal mode decomposition, a measurable portion of geographically corrected orbit error being computed from the filtered normal mode decomposition.

41. The apparatus of claim 40, wherein said model manager receives a set of model basis functions for modeling the geographically correlated orbit error for each ground track of the reference data set, assembles a design matrix based on the model basis functions evaluated at each of the crossover points, and generates the least-squares matrix based on the design matrix and weighting values each computed for a corresponding one of the crossover points.

42. A method for consistently combining altimeter data from multiple satellites by reference sea level data, the method comprising:

generating a least-squares matrix corresponding to estimation of crossover differences at crossover points of respective pairs of ground track for altimeter data from a first altimeter satellite by least-squares minimization, each crossover difference being a difference indicated by the altimeter data between sea level values at the crossover point along respective ground tracks of a corresponding pair of ground tracks; and filtering a normal mode decomposition of the least-squares matrix to remove unmeasurable modes therefrom, the unmeasurable modes having corresponding eigenvalues less in norm than selected multiple of a maximum eigenvalue norm of the normal mode decomposition, a measurable portion of geographically corrected orbit error being computed from the filtered normal mode decomposition.

43. The method of claim 42, further comprising:

correcting the altimeter data according to atmospheric corrections and tidal corrections;

generating a mean sea level data set based on the altimeter data, the mean sea level data set including a mean sea level value for each of a plurality of interpolation points along each of the ground tracks, the crossover differences being determined from the mean sea level data set;

removing the measurable portion of the geographically correlated orbit error from the mean sea level data set based on the filtered normal mode decomposition to generate a reference sea level data set; and removing a measurable portion of geographically correlated orbit error from an input data set based on the reference sea level data set, the input data set representing sea level values measured by a second altimeter satellite.

* * * * *